United States Patent [19]

Conrad et al.

[11] Patent Number: 4,740,152
[45] Date of Patent: Apr. 26, 1988

[54] MIXING BLOCK FOR MIXING A COMBUSTIBLE GAS MIXTURE

[75] Inventors: Hans-Jürgen Conrad, Rutesheim; Wolfgang Mauz, Leinfelden-Echterdingen, both of Fed. Rep. of Germany

[73] Assignee: Robert Bosch GmbH, Stuttgart, Fed. Rep. of Germany

[21] Appl. No.: 897,762

[22] PCT Filed: Dec. 14, 1985

[86] PCT No.: PCT/DE85/00523
§ 371 Date: Jun. 23, 1986
§ 102(e) Date: Jun. 23, 1986

[87] PCT Pub. No.: WO86/04276
PCT Pub. Date: Jul. 31, 1986

[30] Foreign Application Priority Data
Jan. 23, 1985 [DE] Fed. Rep. of Germany ....... 3502026

[51] Int. Cl.$^4$ .......................... F16K 11/18; F23N 5/24
[52] U.S. Cl. .......................................... 431/1; 137/607; 431/346
[58] Field of Search .......... 137/607, 897, 898; 431/1, 346; 432/205

[56] References Cited

U.S. PATENT DOCUMENTS

| | | | |
|---|---|---|---|
| 630,315 | 8/1899 | Barclay | 251/127 |
| 1,151,496 | 8/1915 | Pettis | 431/346 X |
| 3,162,238 | 12/1964 | Claywell et al. | 431/346 X |
| 3,994,668 | 11/1976 | Leisner et al. | 431/346 X |
| 4,487,576 | 12/1984 | Martini | 431/1 X |
| 4,488,865 | 12/1984 | Davis | |
| 4,640,678 | 2/1987 | Fraioli | 137/607 X |

FOREIGN PATENT DOCUMENTS

| | | | |
|---|---|---|---|
| 2505657 | 8/1975 | Fed. Rep. of Germany | 137/897 |
| 1328943 | 4/1963 | France | 137/607 |

Primary Examiner—Martin P. Schwadron
Assistant Examiner—Stephen M. Hepperle
Attorney, Agent, or Firm—Michael J. Striker

[57] ABSTRACT

A mixing block (40) for mixing a combustible gas mixture, consisting of at least two components, for processing materials by means of temperature and pressure concussions, particularly for thermal deburring apparatuses, is suggested, having a gas feed borehole (43 and 44) for each gas component, opening into a mixing and ignition duct (61, 68, 69, 73, 74, 75), wherein a main valve (48, 49, 50, 51 and 52, 53) for admitting the gas components into the mixing and ignition duct (61, 68, 69, 73, 74, 75) and for closing the gas feed boreholes (43 and 44) so as to be gas-tight during the combustion process is arranged in each gas feed borehole (43 and 44). In order to protect the main valves (48, 49, 50, 51 and 52, 53) from the high pressures and temperatures occurring during the combustion process, an auxiliary valve (60, 64, 65, 66, 67), which is controlled synchronously with the main valves, is arranged between an ignition point (76) for the gas mixture and the gas feed boreholes (43 and 44) in the mixing and ignition duct (61, 68, 69, 73, 74, 75).

10 Claims, 2 Drawing Sheets

MIXING BLOCK FOR MIXING A COMBUSTIBLE GAS MIXTURE

PRIOR ART

The invention proceeds from a mixing block according to the type of patent claim 1. In the apparatuses particularly referred to for the thermal deburring of workpieces, which apparatuses are provided with such a mixing block, hydrogen and oxygen, for example, are admitted into pressure cylinders from a reservoir in order, then, to be pressed through the mixing block by gas pushing-in pistons, under considerable compression of up to 100 bar, into a combustion chamber which receives the workpieces to be deburred and which is closed so as to be gas-tight. When the gas mixture is ignited there is an explosion-like combustion. Temporary temperatures of up to several thousand degrees centigrade occur, during which undesired burrs melt away or burn away with the aid of a certain oxygen surplus.

The high pressures and temperatures occurring during the explosion-like combustion must be kept away from the gas pushing-in mechanisms and, for this reason, valves which close the boreholes so as to be gas-tight during the combustion process are arranged in the gas feed boreholes of the mixing block. For this reason, in a known valve arrangement a tappet is displaceably arranged in the gas feed boreholes for each component of the gas mixture to be pumped in and combusted, which tappet releases the gas throughput via the mixing and ignition duct to the combustion chamber in its one end position and, in its other end position, blocks the gas throughput in that it is pressed against the valve seat with a spherical valve surface by means of an external, correspondingly dimensioned force against the pressure occurring during the combustion process. Because of the high stressing of the valves, their construction, which is operationally reliable also for longer service life, brings about considerable difficulties which could not previously be removed with known constructions. Thus, particularly because of soiling of the valve seat, leakiness occurs which increases immediately because of the high thermal loading and leads to unusability of the valves. A plurality of valves are always affected in an apparatus; namely, the main valves, which are arranged in the gas feed boreholes, and at least one bleeder valve for letting off the gas mixture during ignition failures and the like, which is arranged in a borehole passing out of the gas feed borehole and leading outward.

It has been attempted to protect the valves by inserting boreholes between the mixing and ignition duct of the mixing block and the valves, which boreholes are of such a length that the volume of the gas components which are located in the boreholes and which are not combustible solely in themselves is sufficient to form a protective cushion which thermally insulates the valves and elastically intercepts the explosion pressure of the ignited gas mixture. However, it has been shown in practice that such a gas seal is not sufficient in every instance to completely keep away from the valves the factors disadvantageously influencing the service life of the valves (pressure, temperature, soiling). It is known, moreover, from DE-PS No. 24 40 041 to use a liquid seal, instead of a gas seal, for protecting the valves. In this instance, the gas feed boreholes are connected with the valve receiving boreholes via ducts, wherein the ducts and the valve boreholes are fillable, via another valve, with a liquid which is incombustible and substantially neutral relative to combustible gas. Indeed, such a liquid seal forms an effective protection against thermal overstressing of the valves, since the liquid absorbs the high temperatures occurring temporarily during the ignition of the gas mixture accompanied by inherent heating. However, it is not suited to keep away from the valves the high pressures occurring by means of the explosion of the gas mixture, since it maintains its volume. Moreover, the production of such a mixing block is considerably more complicated and more expensive than a comparable mixing block without a liquid seal.

ADVANTAGES OF THE INVENTION

The mixing block with the characterizing features of patent claim 1, according to the invention, has the advantage, on the other hand, that the main valves located in the gas feed boreholes and possibly a bleeder valve are protected in an optimal manner against thermal loading, as well as against soiling and high pressures, and therefore have a very long service life. The auxiliary valve, which is arranged in the mixing and ignition duct, separates the main valves and the bleeder valve from the "hot area", i.e., it blocks the explosion pressure occurring during ignition of the gas mixture, the hot, backflowing gases, and the combustion residues carried along by the latter and keeps them away from the main valves and the bleeder valve. Only a small quantity of gas, which does not combust, remains in the space between the main valves and the auxiliary valve. The closing force of the main valves can be selected so as to be considerably smaller than in known mixing blocks, since they need only absorb the combustion chamber filling pressure, and not, in contrast, the much higher explosion pressure after the ignition of the gas mixture.

Advantageous developments and improvements of the mixing block indicated in patent claim 1 are possible with the aid of the measures stated in the subclaims. Thus, the auxiliary valve can be arranged as an easily exchangeable structural component in an insertion part serving as closing plug for the mixing and ignition duct. A commercially available plate valve with or without sodium cooling is preferably used as auxiliary valve. In order to protect the auxiliary valve, it is advantageous, in addition, that the mixing and ignition duct contain a gas damming step which is arranged between the auxiliary valve and the ignition point. This step damps the combustion pressure wave with the hot, backflowing gases and impurities so that the auxiliary valve is substantially subject only to the temperature which occurs because of the combustion of the relatively small quantity of gas between the valve and the gas damming step. An additional thermal relief of the auxiliary valve can be achieved in that the mixing block is provided with coolant boreholes, particularly in the area of the valve seat of the auxiliary valve.

DRAWING

Other characteristic features follow from the following description with the aid of an embodiment example shown in the drawing.

FIG. 1 shows a schematic drawing of a known apparatus for the thermal deburring of workpieces, FIG. 2 shows the essential parts of a mixing block, constructed according to the invention, in a longitudinal section.

DESCRIPTION OF THE EMBODIMENT EXAMPLE

Figure 1:
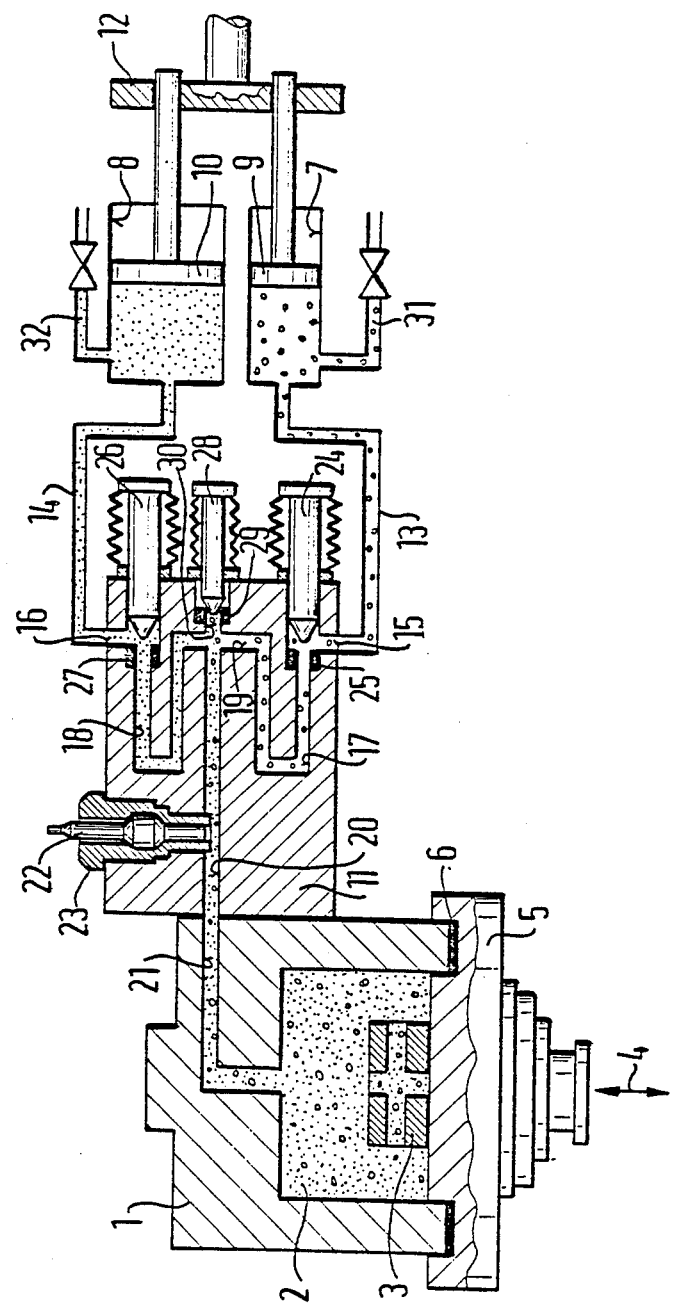

In FIG. 1, 1 designates a workpiece processing chamber which has a combustion chamber 2, in which is located a workpiece 3 which is to be deburred. The workpiece rests on a plate 5 which is movable in the direction of the double arrow 4 and which is placed on the front face of the workpiece processing chamber 1 before the release of the filling and deburring process and which closes the combustion chamber 2 in a gas-tight manner. A seal 6 is arranged between the plate 5 and the front face.

The gas components of the combustible gas-oxygen mixture are introduced into a mixing block 11 via a dosaging cylinder 7 for combustible gas and a dosaging cylinder 8 for oxygen, in each instance, by means of a gas pushing-in piston 9 and 10. The pistons 9, 10 are coupled with one another by means of a yoke 12 so that they execute strokes of equal dimensioning under the influence of a force acting at the yoke 12. Systems with an hydraulic coupling of the gas pushing-in pistons are also known. The dosaging cylinder 8 for oxygen has a greater volume than the dosaging cylinder 7 for combustible gas so that there is a greater quantity of oxygen with equal filling pressure. A mixture of 0-100% oxygen surplus is to be regarded as the standard mixture, wherein hydrogen or natural gas or methane is used as combustible gas.

A compression-resistant line 13 and 14 leads, in each instance, from the dosaging cylinders 7, 8 into the mixing block 11, which consists of a solid metal block. The lines 13, 14 in each instance open into a connection borehole 15 and 16 in the mixing block 11, to which gas feed boreholes 17 and 18 are connected. The boreholes 17, 18 open into a mixing and ignition duct consisting of boreholes 19, 20 which are arranged at right angles relative to one another. The combustible gas mixture flows through the borehole 20 and another borehole 21, which is constructed in the processing chamber 1, into the combustion space 2 of the chamber. An igniting plug 22, which projects into the borehole 20 and fits in an insert 23 of the mixing block 11, serves to ignite the gas mixture. A glow plug or another suitable igniter can also be used instead of an igniting plug. A valve 24, 25 and 26, 27 is located in each instance between the boreholes 15, 17 and 16, 18. These valves, henceforth designated main valves, are opened at the start of the gas pushing-in process by means of resilient force and are closed again after the pushing-in of the gas is concluded when the pistons 9, 10 have reached their end position and no more gas is located in the cylinders 7, 8. The closing of the valves against resilient action and the locking of same during the explosion of the gas mixture located in the chamber 2 is preferably effected by means of hydraulic power. Another valve 28, 29 is arranged in a bleeder borehole 30 which leads away from the borehole 19. This valve is closed during the gas pushing-in process and during the deburring process. It is opened when the chamber is to be bled and the overpressure is to be decreased.

The apparatus operates as follows: the combustible gas and oxygen are admitted into the cylinders 7, 8 via lines 31, 32 with a pressure of, e.g., 5 bar. After the cylinders are filled, the pushing-in pistons 9, 10 push the gases via the mixing block 11 into the combustion chamber 2 of the closed workpiece processing chamber 1 and compress them there to the so-called chamber filling pressure. This can amount to up to 100 bar according to the kind of combustible gas used and the kind of workpiece used. The two gases (oxygen and combustible gas) are mixed with one another in the boreholes 19, 20 of the mixing block 11. After the filling process is concluded, the valves 24, 25 and 26, 27 are closed and the gas mixture is then ignited by means of the igniting plug 22. The flame front then progresses via the borehole 21 to the combustion chamber 2. During the explosion, a pressure of up to 1700 bar and temperatures in the order of magnitude of 3500° C. occur in the combustion chamber. The valves 24, 25; 26, 27 and 28, 29 of the mixing block 11 are also exposed to these pressures and temperatures, since the diverse boreholes of the mixing block ensure the admittance of the hot combustion gases to the valves. The valve seats burn out so that a perfect sealing of the gas feed boreholes 17, 18 and of the bleeder borehole 30 is no longer ensured.

Figure 2:
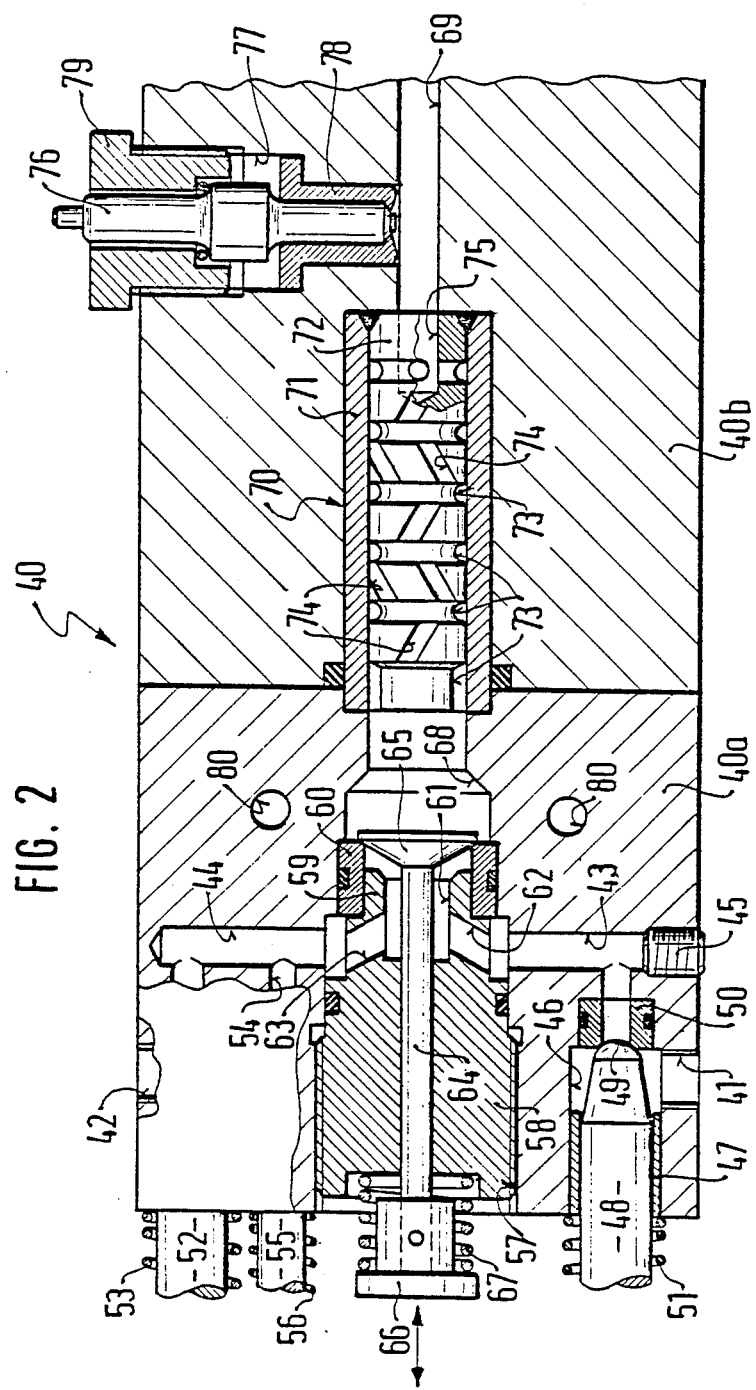

In order to protect the main valves and the bleeder valve against such loading and, accordingly, to increase their life, the mixing block 40, shown in FIG. 2, has means for protecting the valves against high pressures and temperatures. Particularly, the mixing block 40 consists of two parts 40a and 40b, which are securely connected with one another. The left part contains two gas connection boreholes 41, 42 and gas feed boreholes 43,44 for oxygen and combustible gas. The boreholes 43, 44 result from a blind hole borehole which is closed by means of a threaded stopper 45. The connection borehole 41 leads into a multiple-stepped valve borehole 46 which opens into the gas feed borehole 43. Arranged in the borehole 46 is a guide sleeve 47 for a valve tappet 48, whose end 49, which is constructed as a hemisphere, cooperates with a sleeve 50 serving as valve seat. The valve tappet is enclosed by a spring element 51 which seeks to hold the valve in the open position. The closing force for the valve, which closing force overcomes the spring 51, is applied by a hydraulic system, not shown.

An identical valve arrangement, from which only a valve tappet 52 and an opening spring 53 are shown for the sake of clarity, is arranged between the boreholes 42 and 44 for the combustible gas feed.

A bleeder borehole 54, which likewise contains a valve, leads away from the gas feed borehole 44. The valve tappet of this valve is designated by 55 and an opening spring assigned to the latter is designated by 56. The bleeder valve is closed during the pushing in of the gas and during the deburring process. It is only opened in order to be able to produce pressure compensation between the combustion chamber pressure and atmospheric pressure; if necessary, by means of letting off the compressed gas.

A cylindrical insertion part 58, which closes the borehole 57 on one side, fits in a multiple-stepped longitudinal borehole 57 of the mixing block part 40a between the two main valves 48, 49, 50, 51 and 52, 53. The portion of this borehole having the greatest diameter is provided with a thread into which is screwed the insertion part 58. At its end, which is directed into the interior of the mixing block, the insertion part has a shoulder 59 on which sits a sleeve 60 which is sealed relative to the borehole wall. Moreover, the insertion part is provided with an inner borehole 61 in the area of the shoulder 59, two lateral boreholes 62, 63 leading away from said inner borehole 61; borehole 62 produces the connection to the gas feed borehole 43 and borehole 63 produces the connection to the gas feed borehole 44.

The tappet 64 of an auxiliary valve, whose plate 65 cooperates with a sleeve 60 serving as a valve seat, is guided into the insertion part 58. At the free end of the tappet 64 is fastened a collar sleeve 66 at which a spring 67 is supported. This spring endeavors to hold the auxiliary valve in the closing, position shown, its plate 65 resting against the sleeve 60 in this closing position so as to seal. The auxiliary valve is controlled synchronously with the two main valves, i.e. all three valves are opened during the gas pushing-in process and are closed after the conclusion of the pushing in of the gas, before the ignition of the gas mixture.

A borehole 68, which passes into a stepped borehole 69 constructed in the part 40b of the mixing block 40, is connected to the borehole 57 receiving the insertion part 58. A gas damming step 70 is accommodated in the part of this borehole having the greater diameter. This gas damming step 70 consists, in the embodiment example, of a sleeve 71 and a solid round body 72 welded into the latter. The circumference of the round body is provided with recesses 73, 74 which serve as gas guiding ducts; the recesses 73 lying parallel to one another extend along the circumference of the round body 72 in an annular manner, while the recesses 74 produce the connection between the recesses 73. At its end remote of the borehole 68, the round body 72 has a centric borehole 75, to which is connected the part of the stepped borehole 69 having the smaller diameter. Projecting into this borehole part is an igniting plug 76, for which a borehole 77 is provided in the part 40b of the mixing block 40. The borehole 77 contains a sleeve 78 as a fit for the igniting plug, as well as a threaded bush 79 pressing the plug into the fit.

Together, the boreholes 61, 68, 69, 75 and the recesses 73, 74 form a mixing and ignition duct for the gas components entering through the boreholes 41, 46, 43, 62 and 42, 44, 63 when the main valves and auxiliary valve are opened. The gas components undergo a first mixing in the borehole 61 of the insertion part 58 and in the borehole 68 of the part 40a of the mixing block 40 connected at the latter. In the gas damming step 70, the mixing is improved by means of the deflection and swirling of the gases in the recesses 73, 74 so that there is, in the area of the igniting plug 76, a very ignition-friendly gas mixture which ensures a favorable reproducibility of the deburring results.

Aside from the described function as static mixer for the gas components during the gas pushing-in process, the gas damming step fulfills another important function in that, after the explosion of the gas mixture in the combustion chamber, it blocks off the return flow of the hot gases, which are under high pressure, from the combustion chamber into the area of the parts 60, 65 of the auxiliary valve by means of deflection and, accordingly, prevents an excessive loading of the valve through heat and pressure. Essentially only the temperature occurring during the combustion of the relatively small gas quantity in the borehole 68 prevails at the valve plate 65 and at the valve seat 60.

The borehole 61 constructed in the insert 58 is closed off relative to the borehole 68 during the deburring process so that the small and minimally mixed gas quantity located in it can not combust. The main valves arranged in the gas feed boreholes 43, 44 and the bleeder valve, likewise, are accordingly optimally protected against any loading occurring during the deburring process and, therefore, need be exchanged only seldom. The exchange of the somewhat more intensively loaded auxiliary valve is relatively simple and less costly than the simultaneous exchange of two main valves and a bleeder valve. As an additional step for the thermal relief of the auxiliary valve, the latter can be cooled in the area of the valve seat. For this purpose, boreholes 80, guiding cooling fluid, are provided in the part 40a of the mixing block 40. Moreover, commercially available valves filled with sodium can be used, which have a high heat flow-off.

We claim:

1. A mixing block for mixing a combustible gas mixture consisting of at least gas components and for processing materials by means of temperature and pressure concussions resulting from ignition of the gas mixture, particularly for thermal deburring apparatuses, comprising:

a duct (61, 68, 69, 73, 74, 75) formed to accommodate mixing and igniting of the gas mixture;

means for feeding each of the components of the gas mixture into said duct and including a plurality of gas feed boreholes (43, 44) in communication with said duct, each of said gas feed boreholes being formed for feeding a respective one of the components of the gas mixture into said duct;

means for opening each of said gas feed boreholes to admit the gas components into said duct and for closing each of said gas feed boreholes in a gas-tight manner during a combustion process, said opening and closing means including a main valve (48–53) in each of said gas feed bore holes;

means for igniting said gas mixture (76);

mean for protecting said main valves against thermal loading and high pressures occurring from ignition of the gas mixture and including an auxiliary valve (60, 64–67) arranged between said main valve (48–53) and said igniting means (76), said duct (61, 68, 69, 73, 74, 75) being formed with a borehole (69); and a gas damming stage (70) formed as an insertion part (72) fitted in said borehole (69) of said duct (61, 69, 73, 74, 75).

2. A mixing block for mixing a combustible gas mixture consisting of at least two gas components and for processing materials by means of temperature and pressure concussions resulting from ignition of the gas mixture, particularly for thermal deburring apparatuses, comprising:

a mixing block element (40a) having a mixing duct (61, 68, 69);

an ignition block element (40b) having an ignition duct (73, 74, 75), said mixing duct (61, 68, 69) and said ignition block (73, 74, 75) being arranged in communication with each other so as to constitute a common duct (61, 68, 69, 73, 74, 75) and so as to accommodate mixing and igniting of the gas mixture respectively;

means for feeding each of the components of the gas mixture into said mixing duct and including a plurality of gas feed boreholes (43, 44) in communication with said mixing duct, each of said gas feed boreholes being formed for feeding a respective one of the components of the gas mixture into said mixing duct;

means for opening each of said gas feed boreholes to admit the gas components into said mixing duct and for closing each of said gas feed boreholes in a gas-tight manner during a combustion process, said opening and closing means including a main valve (48-53) in each of said gas feed bore holes;

igniting means for igniting said gas mixture (76), said igniting means being arranged in said igniting block element (40b) and in communication with said igniting duct (73, 74, 75);

means for protecting said main valves against thermal loading and high pressures occurring form ignition of the gas mixture and including an auxiliary valve (60, 64-67) arranged in said mixing duct (62, 68, 69) of said mixing block element (40a) between said main valve (48-53) and said igniting means (76), said auxiliary valve (60, 64-67) being spring biased to close off said mixing duct (62, 68, 69); and means for synchronously controlling said auxiliary valve with said main valve so that the valves are closed prior to igniting of said gas mixture.

3. A mixing block according to claim 2, further comprising an insertion (58) serving as a closing plug for said mixing and ignition duct (61, 68, 69, 73, 74, 75), said auxiliary valve (60, 64, 65, 66, 67) being arranged in said insertion part (58).

4. A mixing block according to claim 3, characterized in that said insertion part (58) has a centric borehole (61) which is open toward said gas feed boreholes (43, 44) and is aligned with said duct (61, 68, 69, 73, 74, 75) and which is closable by means of said auxiliary valve (60, 64, 65, 66, 67).

5. A mixing block according to claim 2, characterized in that said auxiliary valve (60, 64, 65, 66, 67) is constructed as a plate valve.

6. A mixing block according to claim 2, characterized in that said duct (61, 68, 69, 73, 74, 75) contains a gas damming stage (70) arranged between said auxiliary valve (60, 64, 65, 66, 67) and said ignition means (76).

7. A mixing block according to claim 2; wherein:
said auxiliary valve having a valve seat (60), said block element (40a) being arranged to have an area by said valve seat (60); and further comprising
means for cooling said valve seat (60) and including a cooling fluid borehole (80) formed in said area of said block element (40a) by said valve seat (60).

8. A mixing block according to claim 2, wherein said auxiliary valve (60, 64-67) is further arranged between said igniting means (76) and where said gas feed boreholes (43, 44) communicate with said mixing duct (61, 69, 69).

9. A mixing block as defined in claim 2, wherein said auxiliary valve has a valve seat (60), said mixing block element having an area by said valve seat (60), said mixing block element being formed with cooling fluid boreholes in said area by said valve seat.

10. A mixing block as defined in claim 2, wherein said protecting means is formed to withstand a pressure up to 1700 bar and a temperature up to 3500° C.

* * * * *